(12) United States Patent
Büttner et al.

(10) Patent No.: US 10,284,032 B2
(45) Date of Patent: May 7, 2019

(54) RELUCTANCE ROTOR WITH RUNUP AID

(71) Applicant: SIEMENS AKTIENGESELLSCHAFT, München (DE)

(72) Inventors: Klaus Büttner, Hollstadt (DE); Marco Cerny, Nüdlingen (DE); Ralf Fischer, Nürnberg (DE); Matthias Warmuth, Windshausen (DE)

(73) Assignee: Siemens Aktiengesellschaft, München (DE)

( * ) Notice: Subject to any disclaimer, the term of this patent is extended or adjusted under 35 U.S.C. 154(b) by 575 days.

(21) Appl. No.: 14/783,509

(22) PCT Filed: Sep. 27, 2013

(86) PCT No.: PCT/EP2013/070274
§ 371 (c)(1),
(2) Date: Oct. 9, 2015

(87) PCT Pub. No.: WO2014/166555
PCT Pub. Date: Oct. 16, 2014

(65) Prior Publication Data
US 2016/0056674 A1    Feb. 25, 2016

(30) Foreign Application Priority Data

Apr. 12, 2013  (EP) .................................... 13163492
Apr. 15, 2013  (EP) .................................... 13163688

(51) Int. Cl.
*H02K 17/16*   (2006.01)
*H02K 1/24*    (2006.01)
(Continued)

(52) U.S. Cl.
CPC ............. *H02K 1/246* (2013.01); *H02K 15/02* (2013.01); *H02K 17/165* (2013.01); *H02K 19/14* (2013.01)

(58) Field of Classification Search
CPC ...... H02K 1/246; H02K 15/02; H02K 17/165; H02K 19/14; H02K 17/16–17/205
See application file for complete search history.

(56) References Cited

U.S. PATENT DOCUMENTS 581,840   A    5/1897  Adams
2,975,310 A    3/1961  Armstrong et al.
(Continued)

FOREIGN PATENT DOCUMENTS

CN    1427527 A      7/2003
CN    202696306 U    1/2013
(Continued)

*Primary Examiner* — Ramon M Barrera
(74) *Attorney, Agent, or Firm* — Henry M. Feiereisen LLC

(57) ABSTRACT

A rotor for a reluctance motor includes a laminate stack having layers. Each layer has a plurality of flux-conducting sections formed in each case by a magnetically conductive rotor lamination and extending transversely to a corresponding q axis. The flux-conducting sections are separated from one another by nonmagnetic flux barrier regions. An electrically conductive and non-ferromagnetic filler material is arranged in a plurality or all of the flux barrier regions of the layers to electrically connect the flux barrier regions of adjacent layers to one another so that cage bars of a rotor cage of the rotor which extend axially parallel or skewed with respect to the axis of rotation are formed by the filler material in the flux barrier regions.

21 Claims, 4 Drawing Sheets

(51) Int. Cl.
*H02K 19/14* (2006.01)
*H02K 15/02* (2006.01)

(56) References Cited

U.S. PATENT DOCUMENTS

| | | | |
|---|---|---|---|
| 5,801,478 A | 9/1998 | Nashiki | |
| 5,893,205 A * | 4/1999 | McClelland | H02K 1/246 |
| | | | 29/598 |
| 2003/0090170 A1 | 5/2003 | Yoshino et al. | |
| 2004/0200654 A1* | 10/2004 | Hatsuda | B60K 6/26 |
| | | | 180/243 |
| 2007/0096588 A1 | 5/2007 | Kirchner et al. | |
| 2011/0316380 A1 | 12/2011 | Büttner et al. | |
| 2012/0133236 A1 | 5/2012 | Büttner et al. | |
| 2012/0169158 A1 | 7/2012 | Büttner et al. | |
| 2012/0187796 A1 | 7/2012 | Büttner et al. | |
| 2012/0205996 A1 | 8/2012 | Büttner et al. | |
| 2013/0175892 A1 | 7/2013 | Büttner et al. | |
| 2013/0187512 A1 | 7/2013 | Büttner et al. | |

FOREIGN PATENT DOCUMENTS

| | | |
|---|---|---|
| CN | 103023255 A | 4/2013 |
| DE | 1282161 B | 11/1968 |
| DE | 10 2011 079 843 | 1/2013 |
| EP | 0141187 A1 | 5/1985 |
| EP | 1130746 A1 | 9/2001 |
| EP | 2442432 A2 | 4/2012 |
| EP | 2 790 296 A1 | 4/2013 |
| EP | 2 793 362 A1 | 4/2013 |
| EP | 2790296 A1 | 10/2014 |
| EP | 2793362 A1 | 10/2014 |
| GB | 2310544 A | 8/1997 |
| JP | H10271779 A | 10/1998 |
| JP | 2001238418 A | 8/2001 |
| RU | 1823090 C | 6/1993 |
| RU | 20153755 C2 | 7/2000 |
| WO | WO 9933156 A1 | 7/1999 |
| WO | WO 2008037849 A1 | 4/2008 |
| WO | WO 2011018119 A1 | 2/2011 |

\* cited by examiner

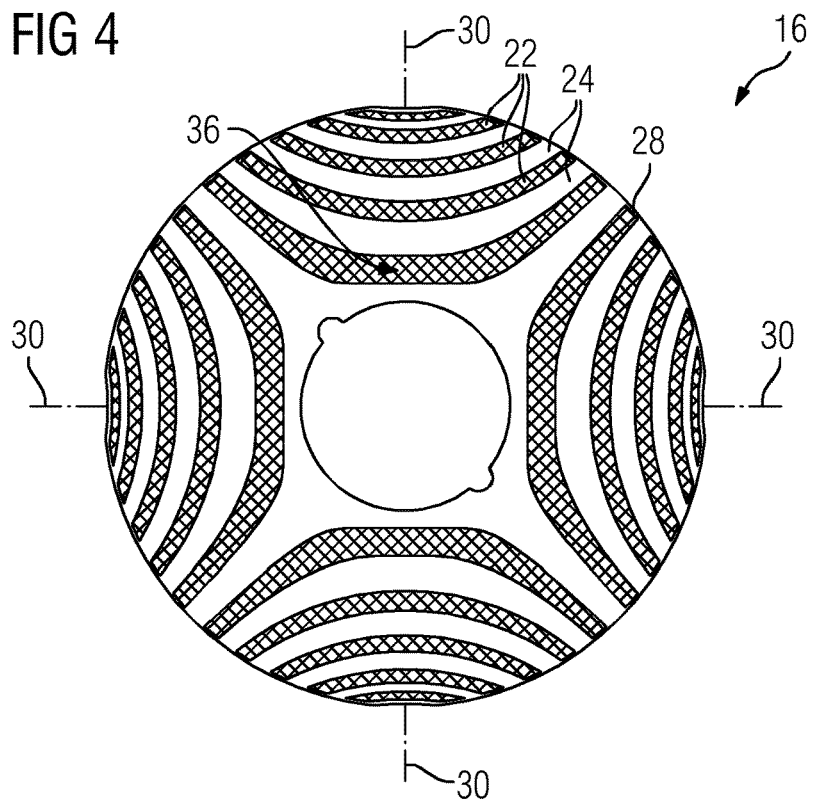
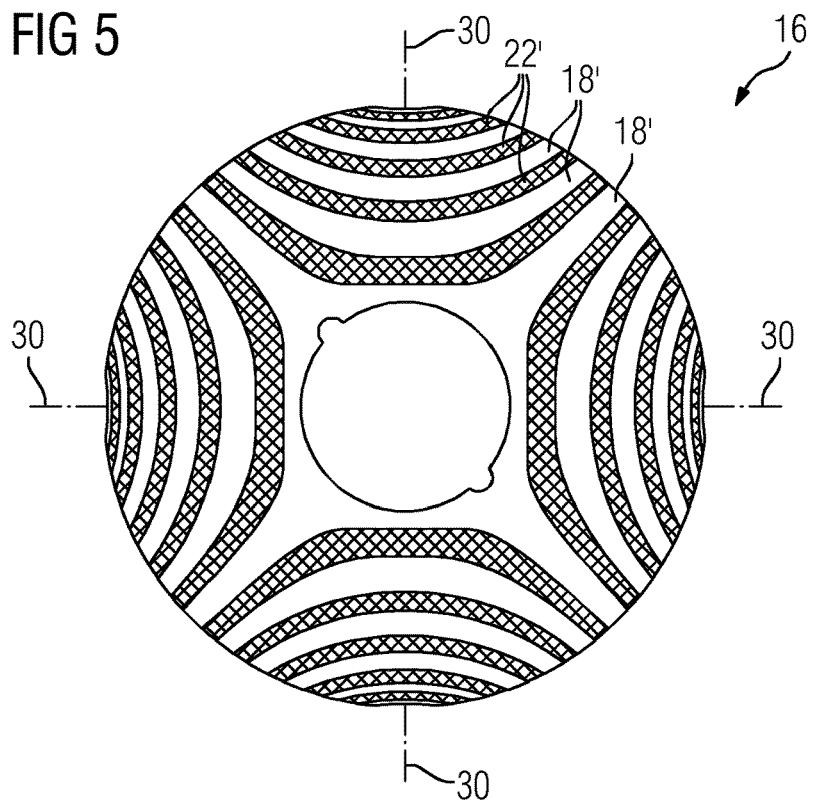

RELUCTANCE ROTOR WITH RUNUP AID

CROSS-REFERENCES TO RELATED APPLICATIONS

This application is the U.S. National Stage of International Application No. PCT/EP2013/070274, filed Sep. 27, 2013, which designated the United States and has been published as International Publication No. WO 2014/166555 and which claims the priorities of European Patent Applications, Serial Nos. 13163492.5, filed Apr. 12, 2013, and 13163688.8, filed Apr. 15, 2013, pursuant to 35 U.S.C. 119(a)-(d).

BACKGROUND OF THE INVENTION

The invention relates to a rotor for a reluctance motor. The rotor has a laminate stack, the individual laminate layers of which have strip shaped flux-conducting sections for the purpose of guiding a magnetic flux between the d-axes of the rotor. For this purpose, the flux-conducting sections run transversely to the relevant q-axis of the rotor and are separated from each other by non-magnetic flux barrier regions.

A rotor of this type is known, for example from U.S. Pat. No. 5,818,140 A. In accordance with this, the flux barrier regions form hollow spaces in the rotor.

The invention further develops the rotor which is described in the European patent application having the application number EP 13 163 492.5 dated 12 Apr. 2013. According to the latter, a supporting element is arranged in the flux barrier regions to support the rotor against centrifugal forces, because the provision of the air barrier regions in the laminate stack reduces its mechanical rigidity. In addition, the invention is also able to further develop the rotor which is described in the European patent application with the application number EP 13 163 688.8, dated 15. Apr. 2013. The content of the two above-mentioned patent applications thus also forms part of the description of the present invention, i.e. the inventive rotor in the present description can also be further developed with the characteristics of the rotors described in the patent applications cited.

Electrical machines with reluctance rotors, that is reluctance motors, are operated in synchronous mode, and hence for their runup, that is in particular for their start-up from rest, they require an inverter, which is generally a component part of a converter. For this reason, reluctance motors are not directly suitable for mains operation, that is for line commutated operation, without a controllable inverter. Runup on a mains supply with a predefined constant alternation frequency is not possible.

For applications which call for mains operation, an asynchronous motor is generally used in place of a reluctance motor. However, asynchronous motors have the disadvantage that their efficiency is generally lower than for a reluctance motor operated in synchronous mode, because the slip which is always present between the rotating stator field and the rotor causes electrical losses in the rotor.

SUMMARY OF THE INVENTION

The object underlying the invention is to equip the reluctance rotor described in the introduction with a runup aid.

This object is achieved by the subjects of the independent claims. Advantageous developments of the invention are given by the characteristics of the sub-claims.

The invention provides a rotor which can be used for a reluctance motor. The rotor has, as described, a laminate stack with layers, of which several taken together have in each case a flux-conducting section formed by a magnetically-conducting rotor plate, each of which extends transversely relative to a q-axis. In particular, the flux-conducting sections are strip-shaped rotor plates which extend lengthwise transversely to the q-axis. For the conduction of the magnetic flux, the rotor plates will preferably have ferromagnetic material, in particular a magnetically soft material, e.g. iron.

The flux-conducting sections are separated from one another in the known manner by non-magnetic flux barrier regions. The flux barrier regions are here non-magnetic, i.e. in particular they contain no ferromagnetic material. In the case of the inventive rotor however, an electrically conductive non-ferromagnetic filler material is now arranged in several or all of the flux barrier regions of the layers. Here, the term electrically conductive is to be understood as meaning that the filler material has a high electrical conductivity, in particular a conductivity greater than $10^5$ S/m (Siemens per meter), preferably greater than $10^6$ S/m. In the context of the invention, a non-ferromagnetic material is, for example, a completely non-magnetic material, e.g. a ceramic with carbon nanotubes or a polymer with carbon nanotubes, or a paramagnetic or diamagnetic material. This filler material extends over several layers, i.e. the filler material also connects together electrically the flux barrier regions on neighboring layers. In other words, the filler material in the flux barrier regions forms a structure which extends axially parallel to or skewed to the axis of rotation of the rotor, which in the laminate stack forms cage bars for a rotor cage of the rotor. The skewed arrangement effects ripple smoothing in the torque curve.

The inventive rotor gives the advantage that the flux barrier regions, with the filler material arranged in them, form cage bars for a rotor cage which then, together with short-circuiting rings, enable a rotor cage for asynchronous runup of the rotor to be integrated into the inventive reluctance rotor. However, after the runup or acceleration in synchronous mode, the rotor then runs purely in accordance with the principle of a synchronous reluctance motor, with significantly higher efficiency or higher power density than for a comparable asynchronous motor, because hardly any losses arise in the armature. This is because in the case of synchronous rotational operation, when the rotor is rotating at the rotational frequency of the magnetic stator's rotating field, there is no movement of the stator field relative to the rotor field, more precisely no induction in the rotor bars of the rotor cage.

The choice of the filler material thus also makes possible the option of optimizing the runup performance of the rotor, independently of its synchronous rotation behavior. The filler material will preferably be rigid in such a way that it stabilizes the rotor against centrifugal forces, so that the rotor is designed for operation at a rotational speed of more than 3000 r.p.m. (rotations per minute), in particular more than 7000 r.p.m.

The filler material will preferably incorporate a metal and/or a metal alloy. Here, different regions can be provided, in each of which another filler material can be arranged, in order for example to adjust the electrical resistance of the rotor cage in accordance with the principle of current displacement at different rotational speeds. In accordance with one form of embodiment of the invention, the filler material incorporates, in at least one region, in each case one the following materials: copper, aluminium, magnesium, an alloy, in this case preferably an aluminium alloy, in particular silumin.

A further possibility for adapting the runup behavior consists, according to one form of embodiment, in only partially filling up the flux barrier regions with the filler material. Of course, the flux barrier regions can also be completely filled up with the filler material. Forms of embodiment of the invention are also provided in which not all the flux barrier regions have the filler material. It can also be provided that a flux barrier region is partially or entirely filled up with an electrically insulating material or with air. A polymer or a ceramic can be provided as the electrically insulating material, for example.

According to one development of the invention, there is arranged on each of the opposing axial stack ends of the laminate stack an electrically conductive and non-ferromagnetic disk, by which the cage bars are electrically connected, and thereby the disks form the short-circuit ring of the rotor cage. These disks can advantageously be provided at low cost by means of a pressure die-casting process or an injection molding process. The disks can be made of the filler material.

In accordance with one form of embodiment of the invention however, provision is made that the disks are made of a material which has a lower electrical conductivity than the electrically conducting filler material in the flux barrier regions. This gives the advantage that by a choice of the material for the disks the electrical resistance of the rotor cage can be defined to set a runup torque for the rotor.

A further possibility, which can be realized at low cost, for setting the electrical resistance of the rotor cage is given in accordance with one form of embodiment, in which the effective conducting cross-section of the disks between two cage bars is in each case so small that the conducting cross-section of the disks has in each case a greater electrical resistance than the cage bars. For example, the thickness of a disk in the axial direction can dimensioned so small that the current path in a link from one cage bar to the next on the disk has a greater electrical resistance than that in the cage bars. The disks can also be constructed as rings, that is with a cutout, by which means the conducting cross-section can also be defined.

In accordance with one form of embodiment, within the laminate stack there is also provided at least one intermediate disk, which can also be made of the filler material or the material used in the two disks located at the ends of the stack. However, the intermediate disk is arranged between two of the layers of the laminate stack. This gives the advantage that it increases the mechanical rigidity of the rotor, and thus enables a higher rotational speed of the rotor.

The filler material and the disks at the ends of the laminate stack are preferably potted by the filler material to form a solid mass, which permits particularly simple installation of the rotor into an electrical machine.

In this connection, the invention also makes available a method for the manufacture of one form of embodiment of the inventive rotor. In accordance with this method, for the purpose of forming each layer of the laminate stack, in each case a magnetically conductive plate is provided which has the flux-conducting sections of the layer and in which are provided, as the flux barrier sections, cutouts which can for example be stamped out from the plate. The plates are stacked up or stacked together to form the laminate stack. After stacking together, the laminate stack then has the electrically conductive filler material cast into it. In doing this, a pressure die-casting process or an injection molding process can be used with particular advantage.

A distinction is made here between the plates which form each layer on the one hand and the rotor plates which form the flux-conducting sections on the other hand. Each plate can incorporate one or several of the rotor plates. During the manufacture of the rotor, the individual strip-shaped flux-conducting sections must if possible be bonded to each other, in order to simplify the manufacturing step. To this end, the flux-conducting sections can be bonded to each other, for example by an outer ring. After the stacking together of the plates, then in accordance with one form of embodiment of the inventive method this outer ring on each magnetically conducting plate will be removed by a machining process, and by this means each of the plates is separated out, each into several rotor plates which are separate from each other.

Finally, the invention also makes available an electric drive arrangement which has an electric machine with a rotor in accordance with one form of embodiment of the invention. Here, the electrical machine is designed for operation as a synchronous reluctance motor or as an asynchronous motor. The advantage of this electrical machine is that it can be run up in an asynchronous mode and can be operated in synchronous mode with a high efficiency. In the case of an asynchronous motor, the advantage lies in the fact that at light load the rotor can also fall into step with the rotating stator field, and this results in a synchronous reluctance operation, by which the electrical losses in the rotor are minimized.

In the simplest case, the electric drive arrangement is simply the single electrical machine itself. However, the inventive drive arrangement can also encompass several electrical machines, that is in addition to the electrical machine described it is possible to provide at least one further electrical machine, each with a rotor which represents a form of embodiment of the inventive rotor. With this form of embodiment, all the machines are connected to a common inverter. With such a group drive there is generally the problem of ensuring synchronous operation for all the electrical machines using the common inverter. In the case of the inventive drive arrangement, this problem does not exist, because a rotor which drops out of step autonomously accelerates back up to the synchronous rotation speed by means of its rotor cage.

In the drive arrangement; it is also possible to provide that one of the electrical machines has a rotor which is not designed in accordance with the invention. The inverter can then be constructed for synchronous operation of this one electrical machine. Because they are also capable of running up asynchronously, all the remaining electrical machines can then also be driven by this inverter.

BRIEF DESCRIPTION OF THE DRAWING

In what follows, an exemplary embodiment of the invention is described. Shown for this are.

DETAILED DESCRIPTION OF PREFERRED EMBODIMENTS

The exemplary embodiment which is explained below is a preferred form of embodiment of the invention. In the case of the exemplary embodiment however, the components which are described for this form of embodiment each represent individual characteristics of the invention which are to be considered independently of each other, each of which also develops the invention independently of the others and thus are also to be regarded individually or in combinations other than that shown as an integral part of the invention. Furthermore, the form of embodiment described can also be enhanced by other characteristics of the invention which have already been described.

Figure 1:
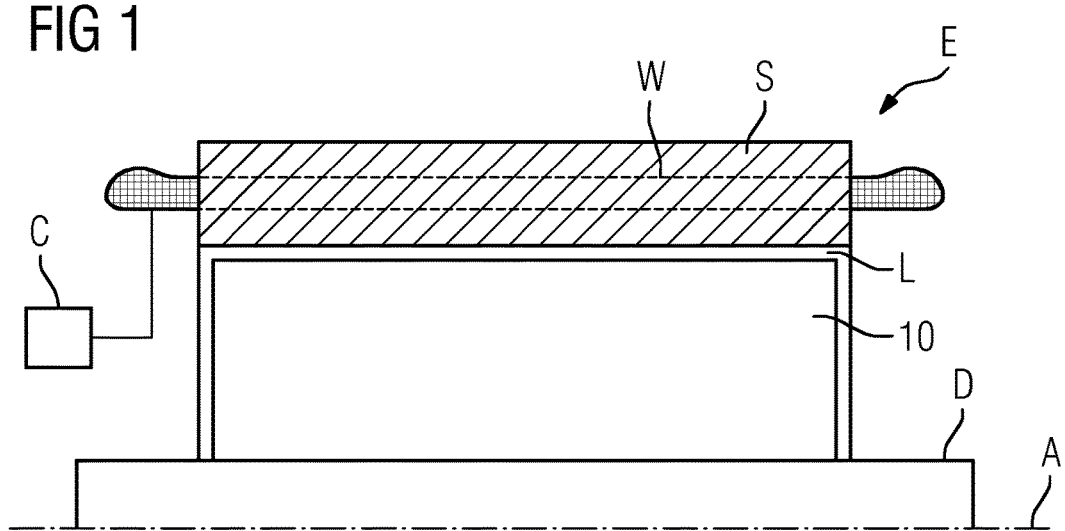
FIG. 1 a schematic diagram of a cross-section through one form of embodiment of the inventive drive arrangement, FIG. 2 a schematic diagram of a perspective view of a rotor of the electrical machine in FIG. 1, FIG. 3 a schematic diagram of a perspective view of a partial section of a rotor cage of the rotor in FIG. 2, FIG. 4 a schematic diagram of a layer of a laminate stack of the rotor in FIG. 2, and FIG. 5 a schematic diagram of a layer of a laminate stack of another form of embodiment of the inventive rotor.

FIG. 1 shows an electrical machine E, which could be for example a synchronous reluctance motor or an asynchronous motor. In FIG. 1, the axis of rotation A also represents an axis of symmetry for the diagram. The electrical machine E incorporates a stator S, in which are arranged windings W of electrical coils, where only one of the windings W is shown in FIG. 1. Flowing through the windings W is an alternating current from a current source C, which results in a rotating magnetic field in an air gap L in the interior of the electrical machine E. The alternating current source C can, for example, be an inverter or a fixed frequency supply network.

In the interior of the stator S there is a rotor 10, which has a torsionally rigid joint to a shaft D. The shaft D is mounted in the stator S so that it can rotate about the axis of rotation A. The rotor 10 is one form of embodiment of the inventive rotor.

Figure 2:
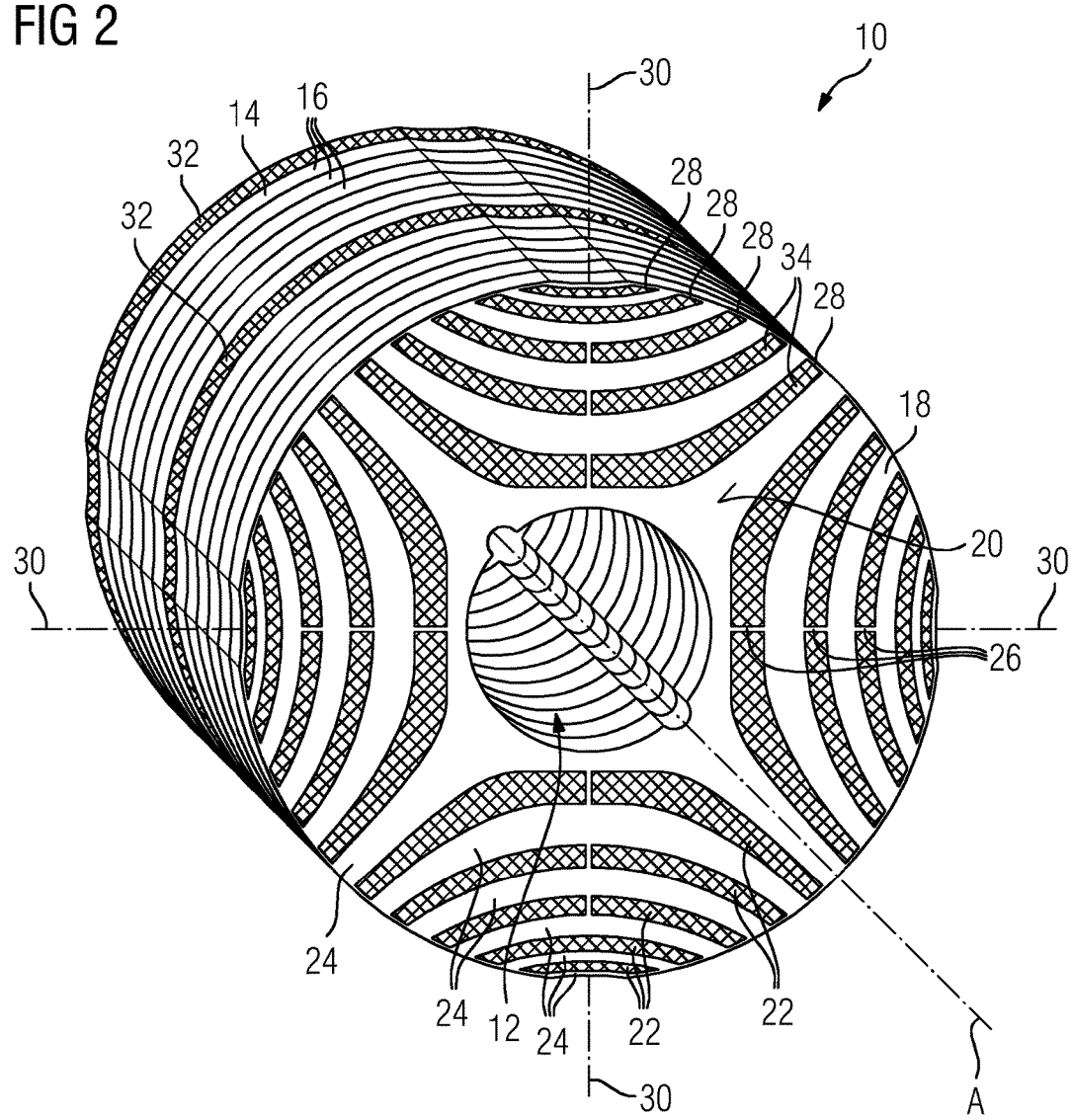

FIG. 2 shows solely the rotor 10.

The shaft D (not shown further in FIG. 2) is inserted through a through-hole 12 in the rotor 10. The diameter of the rotor 10 can be greater than 20 cm in the radial direction relative to the axis of rotation A. The length of the rotor 10 in the axial direction can be greater than 30 cm.

As the magnetically active part, the rotor 10 has a laminate stack 14 which is formed from several layers 16, each of which has a material which is ferromagnetic, in particular magnetically soft. For the sake of clarity, in FIG. 2 only a few of the magnetic layers 16 have been given a reference mark. Between the layers there is in each case, in the familiar way, an electrically insulating layer, in order to block eddy currents in the laminate stack 14. In the example shown in FIG. 2, each layer 16 is formed in each case by a rotor plate 18. In FIG. 2, only the rotor plate 18 which is located on a face 20 of the laminate stack, at a front end in the axial direction along the axis A, has been given a reference mark. The rotor plate 18 (and correspondingly also the remaining rotor plates of the remaining layers 16) has cutouts 22 which form barriers for a magnetic flux, that is, flux barrier regions. The cutouts 22 can, for example, be formed by stamping out the appropriate shapes from the rotor plate 18.

Hence, on the rotor plate 18 there are only flux-conducting sections 24 and bars 26 for the purpose of joining mechanically the flux-conducting sections 24 present, together with an outer ring 28 for the purpose of joining mechanically the flux-conducting sections 24. The rotor plates of the layers 16 can all have the same shape. By means of the flux-conducting sections 24 a magnetic flux, which is produced by electrical coils of the stator, is conducted in the reluctance motor across the q-axis 30 of the rotor 10 along a preferred direction of magnetization.

The rotor plates can be arranged in the laminate stack 14 aligned axially one behind another in such a way that the cutouts 22 and correspondingly also the flux-conducting sections 24 are axially aligned. Overall, the cutouts 22 in all the rotor plates 18 which are arranged one behind another form shafts or spaces in the laminate stack 14, in which there can be non-ferromagnetic material.

Figure 3:
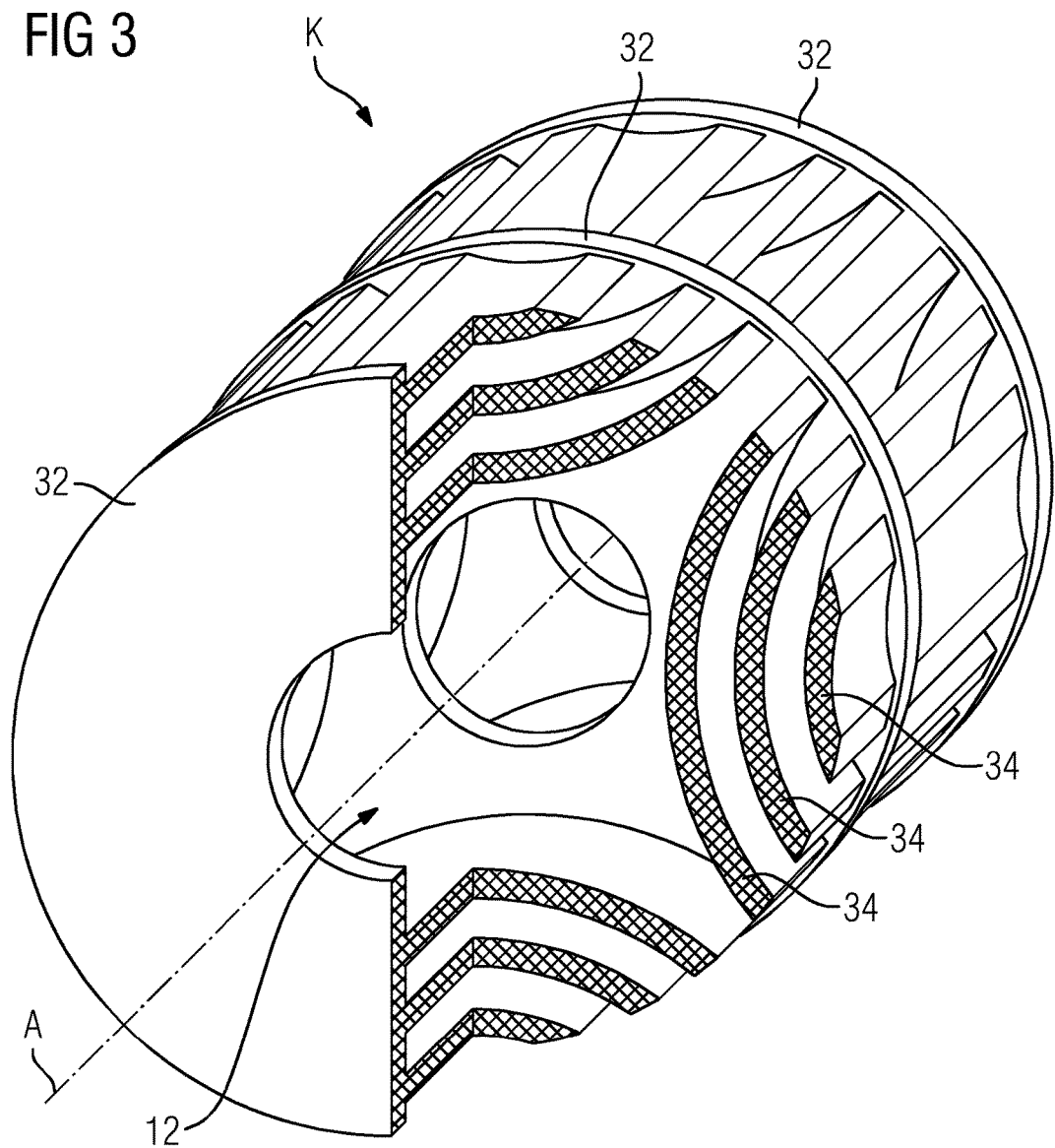

Integrated into the rotor 10 is a rotor cage K, which enables the rotor 10 also to be run up asynchronously to the rotating magnetic field of the stator S, i.e. with a slippage. FIG. 3, shows the rotor cage K without the magnetic flux-conducting sections 24 which are embedded in it. By filling up the flux barriers, i.e. the shafts formed in the laminate stack 14 by the cutouts 22, the rotor cage can be manufactured with a filler material which is non-ferromagnetic but electrically conductive. By this means, cage bars 34 of the non-ferromagnetic, electrically conductive filler material are formed in the cutouts 22. In order to electrically short-circuit the cage bars 34, the cage bars 34 which are in the cutouts 22 are connected electrically by fully-filled component regions in the form of electrically conductive cylindrical disks 32. Here, "fully-filled" means that the through hole 12 for the shaft is of course also provided in the disks 32. The disks 32 form short-circuit rings of the rotor cage K.

Two of the disks 32 are provided on the two end-faces, i.e. the end-face 20 and the axially opposite end of the laminate stack 14. In FIG. 2, the front disk 32, which is located on the end-face 20, is not shown in order to enable the structure of the rotor plate 18 to be shown. It is also possible to provide that only the disks 32 which lie axially outside the ends of the laminate stack are electrically conducting and one or several of the intermediate disks in the laminate stack are of an electrically insulating material.

The casting compound of an electrically conductive filler material can, for example, have been introduced into the cutouts 22 and into the region of the disks 32 by means of an injection molding or pressure casting process, after the stacking up, i.e. the side-by-side arrangement of the rotor plates 18. In order to define the thickness of the disks 32 and their position, the rotor plate stack 14 can be held spaced apart during the stacking up by spacing pieces, for example rings or pads, so that cylindrical disks 32 of the casting compound are produced by the casting.

The rotor cage K which is formed by means of casting into the cutouts 22 produces a combination of the reluctance effect, produced by the flux-conducting sections 24, with the short-circuit cage or rotor cage K corresponding to an asynchronous motor. This makes an asynchronous runup on the electrical supply network possible even without a converter.

In doing so, the rotor 10 initially rotates asynchronously relative to the stator's rotating field. It is however possible, by an appropriate design of the motor, i.e. setting the electrical resistances of the disks 32 and of the cage bars 34, to structure the ability to fall into step in such a way that the rotor 10 falls into the synchronous rotation speed of the stator's rotating field.

The flux barriers can, as shown, be completely filled with the electrically conducting material. However, it is also possible to provide a partial filling. As the electrically conducting material, use can be made of a single material or it is also possible to use several materials with different characteristics in the different regions of the flux barriers, i.e.

the cutouts 22. Materials which could preferably be used could be: copper, aluminium, silumin, magnesium.

In order to influence the motor characteristics of the electrical properties of the machine E, use can also be made of a different material in the cage 34 bars in the flux barriers, on the one hand, and for the short-circuit rings, i.e. the disks 32, on the other hand. A high electrical conductivity of the material in the flux barriers, i.e. the cage bars 34, produces a lower slip, and hence a rotation speed which is very close to the synchronous rotation speed. If, in addition, one aims at a high torque, a material with a low electrical conductivity can be used for the short-circuit ring. It is also possible to increase torque by restricting the cross-section of the short-circuit rings, because they are only required for the runup.

From these two parameters (electrical conductivity and short-circuit ring cross-section) it is possible to configure the electrical machine E optimally in terms of the maximum rotational speed in asynchronous network operation and of the torque for the particular situation in which the electrical machine is to be used.

The electrical conductivity of the casting material can be used to influence, for example, the runup or starting behavior. Parameters which can be adjusted by means of the casting compound are, for example, the starting torque, the efficiency, the runup behavior, the characteristics for pulling into synchrony and the rotational speed for asynchronous mains operation.

It is also possible during the casting to form the two short-circuit rings on the ends of the laminate stack, by which means a mechanically rigid bonding of the laminate stack 14 is created. The laminate stack 14 can be used as a single component. It is possible to avoid an elaborate process for bonding the individual plates onto the shaft W, together with tightening up the end disks 32, thereby saving on manufacturing costs. In addition, the casting mass inhibits radial and axial vibrations of the individual rotor plates 14, because the structure is rigid.

A further advantage results from the fact that only one sheet-cutting operation is required to produce both the converter-powered and the mains-powered embodiments, and that the use of casting can also be used to produce the purely mains-powered embodiment.

The use of the rotor cage K in the synchronous reluctance technology achieves the advantage that a high level of efficiency is realized at the same time as the capability for mains supply operation. It is thus possible to forgo a converter. The casting compound makes possible a rotor laminate stack as a one-piece component, which has a favorable effect on the assembly of a rotor. The rotational speed suitability can be increased by material with high tensile strength and materials with suitable fillers, for example fibers.

The use of the inventive rotor enables improvements in the following areas of usage. It can be used as a replacement for a pure state-of-the-art asynchronous motor, but with a more compact construction due to the higher power density in the rotor 10 and its higher efficiency from the combination of asynchronous operation and reluctance. It can be used as a replacement for a purely synchronous state-of-the-art reluctance motor, with an asynchronous startup capability being provided and operation without a converter being made possible. It can be used as part of a group drive, in which the parallel or simultaneous use of several synchronous reluctance motors on a single frequency converter is realized, whereby this frequency converter can be of a very simple design because it does not require any feedback from the current rotational speed of the motors.

FIG. 4 and FIG. 5 show alternative forms of embodiment of rotors, in which the individual magnetic layers 16 are of different design. These forms of embodiment have the advantage that the magnetic flux guides required for the development of the reluctance are influenced to an even lesser extent than in the case of the rotor 10 by bracing elements, such as the bars 26 and the outer ring 28. For the purpose of better orientation, elements in FIG. 4 and FIG. 5 which correspond in respect of their function to elements shown in FIG. 1 or FIG. 2 have been given the same reference marks as in FIG. 1 or FIG. 2 respectively.

FIG. 4 shows a magnetic layer 16 of a rotor in which are provided several flux-conducting sections 24, which are again separated from each other by the cutouts 22, but which are held together solely by an outer bar or ring 28. At the locations 36, where the bars 26 are provided on the rotor plates 18 of the rotor 10, there is again a non-magnetic region in the magnetic layer 16 in FIG. 4, as formed by the cutouts 22.

FIG. 5 shows a magnetic layer of a rotor in which individual flux-conducting sections are formed by rotor plates 18' which are separated from each other, between which there are in each case non-magnetic regions 22', such as in particular synthetic resin. A rotor with magnetic layers 16, such as is shown in FIG. 5, can be constructed for example from a rotor with a magnetic layer, as shown in FIG. 4. In that a rotor as in FIG. 4 is machined down by a machining process on the outer ring 28, one obtains a rotor with a magnetic layer 16, as shown in FIG. 4.

All in all, the invention provides a reluctance rotor with an integral starter cage which can be used to advantage, in particular in a synchronous reluctance motor.

What is claimed is:

1. A rotor for a reluctance motor, said rotor comprising:
    a laminate stack defining an axis of rotation and having layers, each layer including a magnetically conductive rotor plate forming flux-conducting sections which extend transversely relative to a q-axis and are separated from each other by non-magnetic flux barrier regions;
    an electrically conductive and non-ferromagnetic filler material arranged in at least several of the flux barrier regions of the layers to electrically connect flux barrier regions of neighboring ones of the layers and thereby form in the flux barrier region cage bars of a rotor cage of the rotor in axially parallel or skewed relationship to the axis of rotation, and
    an intermediate disk formed from the filler material and arranged between two adjacent ones of the layers,
    wherein the cage bars and the intermediate disk are die-cast from the filler material concurrently to form a unitary structure.

2. The rotor of claim 1, wherein the filler material has a region made at least of one element selected from the group consisting of copper, aluminium, magnesium, and an alloy.

3. The rotor of claim 2, wherein the alloy is an aluminium alloy.

4. The rotor of claim 3, wherein the aluminium alloy is silumin.

5. The rotor of claim 1, wherein the filler material is sized to only partially fill the flux barrier regions.

6. The rotor of claim 1, wherein the laminate stack has opposite axial ends, and further comprising electrically conductive and non-ferromagnetic disks arranged on the axial ends, respectively, and die-cast from the filler material concurrently to electrically connect the cage bars and to thereby form short-circuit rings of the rotor cage.

7. The rotor of claim 1, wherein an effective conducting cross-section of the intermediate disk between two cage bars an is low enough that the electrical resistance of the effective conducting cross-section is greater than an electrical resistance of each of the cage bars.

8. The rotor of claim 1, wherein the rotor plates of the layers are bonded together by the filler material to form a rigid entity.

9. The rotor of claim 1, wherein the two adjacent ones of the layers are held apart by spacing pieces.

10. An electrical drive arrangement, comprising an electrical machine configured to operate as synchronous reluctance motor or asynchronous motor, said electric machine including a rotor comprising a laminate stack defining an axis of rotation and having layers, each layer including a magnetically conductive rotor plate forming flux-conducting sections which extend transversely relative to a q-axis and are separated from each other by non-magnetic flux barrier regions, and an electrically conductive and non-ferromagnetic filler material arranged in at least several of the flux barrier regions of the layers to electrically connect flux barrier regions of neighboring ones of the layers and thereby form in the flux barrier region cage bars of a rotor cage of the rotor in axially parallel or skewed relationship to the axis of rotation, and an intermediate disk formed from the filler material and arranged between two adjacent ones of the layers, wherein the cage bars and the intermediate disk are die-cast from the filler material concurrently to form a unitary structure.

11. The drive arrangement of claim 10, further comprising at least one further said electrical machine, and a common inverter to connect the electrical machine and the further electrical machine.

12. The electrical drive arrangement of claim 10, wherein the filler material has a region made at least of one element selected from the group consisting of copper, aluminium, magnesium, and an alloy.

13. The electrical drive arrangement of claim 10, wherein the filler material is sized to only partially fill the flux barrier regions.

14. The electrical drive arrangement of claim 10, wherein the laminate stack has opposite axial ends, and further comprising electrically conductive and non-ferromagnetic disks arranged on the axial ends, respectively, to electrically connect the cage bars and to thereby form short-circuit rings of the rotor cage.

15. The electrical drive arrangement of claim 14, wherein the disks are made of a material which has a lower electrical conductivity than a material of the filler material.

16. The electrical drive arrangement of claim 10, wherein an effective conducting cross-section of the intermediate disk between two cage bars is low enough that the electrical resistance of the effective conducting cross-section is greater than an electrical resistance of each of the cage bars.

17. The electrical drive arrangement of claim 10, wherein the rotor plates of the layers are bonded together by the filler material to form a rigid entity.

18. The drive arrangement of claim 10, wherein the two adjacent ones of the layers are held apart by spacing pieces.

19. A method for manufacturing a rotor, comprising:
forming a laminate stack from a plurality of layers, each layer including a magnetically conductive rotor plate forming flux-conducting sections which extend transversely relative to a q-axis and are separated from each other by non-magnetic flux barrier regions, wherein the flux-conducting sections are separated from each other by non-magnetic flux barrier regions;
arranged in at least several of the flux barrier regions of the layers an electrically conductive and non-ferromagnetic filler material to electrically connect flux barrier regions of neighboring ones of the layers and thereby form in the flux barrier region cage bars of a rotor cage of the rotor in axially parallel or skewed relationship to the axis of rotation,
forming an intermediate disk from the filler material and arranging the intermediate disk between two adjacent ones of the layers,
wherein the cage bars and the intermediate disk are die-cast at a same time from the filler material to form a unitary structure.

20. The method of claim 19, further comprising die-casting short-circuit rings of the rotor cage on opposite axial ends of the laminate stack at the same time to electrically connect the cage bars.

21. The method of claim 19, wherein the two adjacent ones of the layers are held apart by spacing pieces to allow inflow of the filler material during die-casting.

* * * * *